US009276908B2

(12) United States Patent
Johansson et al.

(10) Patent No.: US 9,276,908 B2
(45) Date of Patent: *Mar. 1, 2016

(54) AUTOMATIC APPLICATION DEPENDENT ANONYMIZATION

(71) Applicant: Amazon Technologies, Inc., Reno, NV (US)

(72) Inventors: Jesper M. Johansson, Redmond, WA (US); Darren E. Canavor, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,155

(22) Filed: Jul. 25, 2014

(65) Prior Publication Data

US 2014/0337998 A1 Nov. 13, 2014

Related U.S. Application Data

(63) Continuation of application No. 13/561,686, filed on Jul. 30, 2012, now Pat. No. 8,793,805.

(51) Int. Cl.
*G06F 17/30* (2006.01)
*H04L 29/06* (2006.01)

(52) U.S. Cl.
CPC ............ *H04L 63/0421* (2013.01); *G06F 17/30* (2013.01); *H04L 63/08* (2013.01)

(58) Field of Classification Search
CPC ......... G06F 21/00; G06F 21/10; G06F 21/30; G06F 21/44; G06F 21/60; G06F 21/62; G06F 21/604; G06F 17/30; H04L 63/10; H04L 63/101; H04L 63/102; H04L 63/104; H04L 63/0421; H04L 63/08; G06Q 20/383
USPC ............. 726/2–4, 26–30; 713/150, 165–167, 713/193; 705/74, 75

See application file for complete search history.

(56) References Cited

U.S. PATENT DOCUMENTS

| 5,815,665 | A | 9/1998 | Teper et al. | |
| 6,938,022 | B1 * | 8/2005 | Singhal | 705/74 |
| 7,188,358 | B1 | 3/2007 | Hisada et al. | |
| 7,366,897 | B2 * | 4/2008 | Noble | 713/156 |
| 7,404,079 | B2 * | 7/2008 | Gudbjartsson et al. | 713/168 |
| 8,042,193 | B1 | 10/2011 | Piliouras | |
| 8,762,741 | B2 * | 6/2014 | Chase et al. | 713/193 |
| 8,793,805 | B1 * | 7/2014 | Johansson et al. | 726/26 |
| 8,978,158 | B2 * | 3/2015 | Rajkumar et al. | 726/28 |

* cited by examiner

*Primary Examiner* — Hosuk Song
(74) *Attorney, Agent, or Firm* — Thomas | Horstemeyer, LLP

(57) ABSTRACT

Disclosed are various embodiments for facilitating the anonymization of unique entity information when transmitting data to services. A content server may store entity identifiers that respectively represent entities associated with the content server. The content server may send anonymized responses to requests for data from multiple services, the data being associated with entity identifiers. The anonymized responses may comprise the data requested in association with anonymous entity identifiers as opposed to the entity identifiers. The requesting services may each receive a different anonymous identifier representing a single entity.

20 Claims, 6 Drawing Sheets

AUTOMATIC APPLICATION DEPENDENT ANONYMIZATION

CROSS-REFERENCE TO RELATED APPLICATION

This application is a continuation of, and claims priority to, co-pending U.S. Patent Application entitled "AUTOMATIC APPLICATION DEPENDENT ANONYMIZATION," filed on Jul. 30, 2012, and assigned application Ser. No. 13/561,686, which is incorporated herein by reference in its entirety.

BACKGROUND

The collection and use of sensitive information deserves heightened protection. In some cases, third party services can gain access to private user information. Such uncontrolled access to private sensitive information could result in serious security risks, including online identity abuse.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure are directed to anonymizing information that a content server transmits to requesting services. Suppose a content server associates users with respective unique user attributes, such as a user identifier. Problematically, services requesting data associated with these users may easily correlate the user attributes to gain access to private user information. For example, suppose a first service requests data from a content server in association with a user represented by an obfuscated identifier. Further, a second service requesting data from the content server may receive data in association with the same obfuscated identifier used to represent that user. Accordingly, the two services may correlate the received obfuscated identifiers and recognize that they are the same, thereby enabling the two services to exchange or aggregate private data regarding the user.

According to various embodiments, the creation of constantly changing references to the unique attributes of users or items is employed. For example, if two services request data from the content server, some embodiments of the present disclosure facilitate the creation of two different anonymous identifiers to represent each user associated with the data requested. The content provider may send to the first service the data in association with one of the anonymous identifiers. The content provider may then send to the second service the data in association with the different, anonymous identifier. Since the two anonymous identifiers are different, the services may not collaborate to aggregate the user information.

In addition, other aspects of the present disclosure are described. In the following discussion a general description of the system and its components is provided followed by a discussion of the operation of the same.

Figure 1:
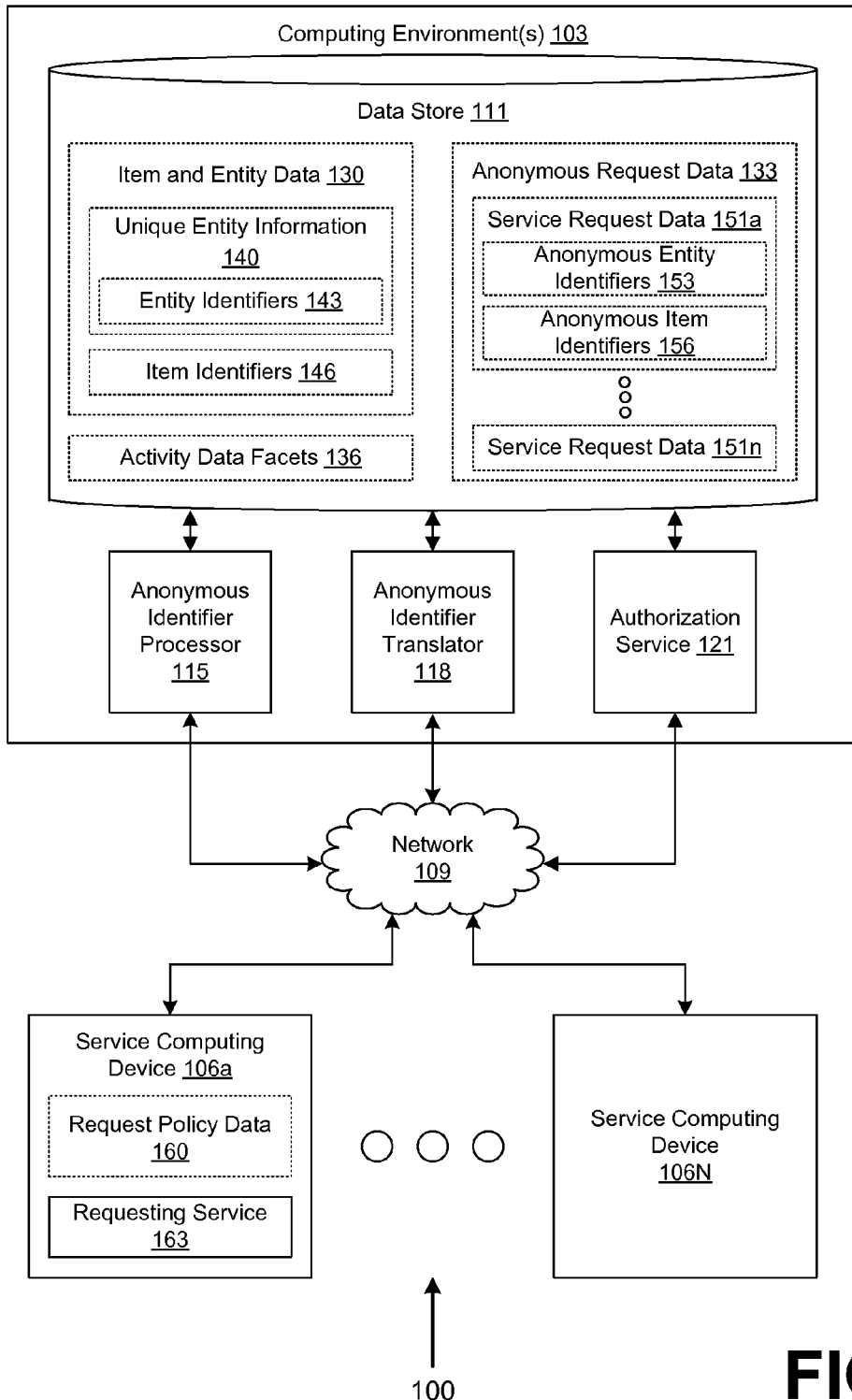
FIG. 1 is a drawing of a networked environment according to various embodiments of the present disclosure.

With reference to FIG. 1, shown is a networked environment 100 according to various embodiments. The networked environment 100 includes a computing environment 103 in data communication with a plurality of service computing devices 106a...106N by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing environments may be employed that are arranged, for example, in one or more server banks or computer banks or other arrangements. For example, a plurality of computing environments 103 together may comprise a cloud computing resource, a grid computing resource, and/or any other distributed computing arrangement. Such computing environments 103 may be located in a single installation or may be distributed among many different geographical locations. For purposes of convenience, the computing environment 103 is referred to herein in the singular. Even though the computing environment is referred to in the singular, it is understood that a plurality of computing environments 103 may be employed in the various arrangements as described above. As non-limiting examples, the entity associated with the computing environment 103 may correspond to an e-commerce application, cable television provider, radio subscription provider, Internet advertising service, Internet content provider, magazine publisher, newspaper publisher and/or other content providers.

Various applications and/or other functionality may be executed in the computing environment 103 according to various embodiments. Also, various data is stored in a data store 111 that is accessible to the computing environment 103. The data store 111 may be representative of a plurality of data stores as can be appreciated. The data stored in the data store 111 for example, is associated with the operation of the various applications and/or functional entities described below.

The components executed on the computing environment 103, for example, include an anonymous identifier processor 115, an anonymous identifier translator 118, an authorization service 121 and other applications, services, processes, systems, engines or functionality not discussed in detail herein. The anonymous identifier processor 115 is executed to generate anonymous entity identifiers 153 representing each entity associated with data that is requested from one of the service computing devices 106. Such anonymous entity identifiers 153 may be generated in response to determining that one of the service computing devices 106 does not have authorization to access the entity identifiers 143 and/or in response to determining that a service computing device 106 has requested anonymized access to the data.

The anonymous identifier processor 115 may also transmit to the service computing device 106 the data in association with the generated anonymous entity identifiers 153 instead of the entity identifiers 143 associated with the data. Accordingly, the service computing device 106 may not have access to the entity identifiers 143. In some embodiments of the present invention, the anonymous identifier processor 115 may generate anonymous entity identifiers 153 representing any one of the unique entity information 140 or representing one of the item identifiers 146. In such embodiments, it is noted that the service computing device 106 does not have access to the unique entity information 140 or item identifiers 146 that could be used to assist in identifying any specific entity associated the respective anonymous entity identifiers 153.

The authorization service 121 is executed in order to determine whether the one of the service computing devices 106 is authorized to receive access to the unique entity information 140. In response to determining that the service computing device 106 requesting data is authorized to receive access to the unique entity information 140 and has not requested anonymized access to the data, the authorization service 121 may transmit the data requested in association with the unique entity information 140. The authorization service 121 may employ locally stored entity data to perform the authorization, and/or the authorization service 121 may communicate with a remote authorizer via the network. The authorization service 121 may implement authorization via the network using Remote Authentication Dial In User Service (RADIUS), Kerberos, Diameter, Terminal Access Controller Access-Control System (TACACS) and/or other authentication protocols as can be appreciated.

The anonymous identifier translator 118 is executed to obtain an anonymous entity identifier 153 from one of the service computing devices 106 and then translate that anonymous entity identifier 153 into the corresponding unique entity information 140. In one embodiment, the anonymous identifier translator 118 will receive an anonymous entity identifier 153 from a service computing device 106. In response to the authorization service 121 determining that the service computing device 106 is authorized to receive access to the corresponding entity identifier 143, which the anonymous entity identifier 153 represents, the anonymous identifier translator 118 may transmit the translated entity identifier 143 to the service computing device 106. Alternatively, the anonymous identifier translator 118 may deny the translation request.

The data stored in the data store 111 accessible to the computing environment 103 includes, for example, item and entity data 130, anonymous request data 133, activity data facets 136 and potentially other data. In various embodiments, the activity data facets 136 comprise data that indicates how an entity behaves in the computing environment 103.

The activity data facets 136 may relate to entity behavioral events that correspond to some action that is performed on the entity represented by the computing environment 103. Such actions may include, for example, adding a particular item to a list of items (e.g., wish list, shopping list, etc.), viewing a detail page for a particular item, executing a particular search query, accessing a particular network page along with other actions. Such actions may also include actions undertaken on social networking sites, e.g., being added to a circle of friends, adding another entity to a circle of friends and other social network actions. The activity data facets 136 may also include search history, television programs viewed, audio programs presented, printed publication subscriptions, network sites visited, prior online purchase history and so on. The computing environment 103 may transmit activity data facets 136 to third parties, such as a service computing device 106.

The item and entity data 130 includes, for example, unique entity information 140, entity identifiers 143, item identifiers 146 and potentially other data. An entity may refer to a user, an individual, a service, an organization, a group of individuals, a team, a corporation, a cooperative, a partnership or any combination thereof. The unique entity information 140 includes information that may be used to identify entities of the computing environment 103. The unique entity information 140 may include the entity name, entity address, entity email address and/or other data that may be used to identify an entity. The entity name may include, for example, title, first name, last name, middle name, middle initial, suffix, names of spouses, names of children and/or other data. The entity address may include, for example, mailing addresses, billing addresses, cities, states, countries, zip codes, postal codes and/or other data. The entity email address may include one or more email addresses where a customer receives email from the entity associated with the computing environment 103. It is understood that other data that may be used to identify an entity may be included in the unique entity information 140 such as, for example, telephone numbers, fax numbers, government-issued unique identifiers, payment instrument numbers, etc. The unique entity identifiers 143 may also include passwords, keys, cookie identifiers and/or other information that may be employed for authentication that relates to data that an entity has or knows.

An entity may maintain and control access to the data stored in item and entity data 130. Such an entity may deny a service access to the item and entity data 130. Moreover, the entity that restricts access to the item and entity data 130 may restrict certain portions of item and entity data 130 for certain services. In such a case, a service may have access to a certain portion of item and entity data 130 while not having access to the rest of the item and entity data 130. If the service attempts to request data concerning any other portion of item and entity data 130 that the service does not have access to, the entity that restricts access to the item and entity data 130 may deny the service access to such data.

Further, the entity that restricts access to item and entity data 130 may also control multiple services. An internal service refers to such a service that is controlled by the entity that also restricts access to the item and entity data 130. Consequently, such an internal service may be allowed to access the item and entity data 130 without restriction. For example, an internal service may receive an entity identifier 143 in response to an anonymous identifier translation request from the anonymous identifier translator 118.

On the other hand, an external service may refer to a service that is not controlled by the entity that restricts access to the item and entity data 130. An external service may not have access to the item and entity data 130 that corresponds to any anonymized data. Allowing the external service to access the item and entity data 130 may pose security risks because the external service may correlate the data and gather confidential information about entities. However, an internal service may not pose the same security risk because the entity that restricts access to the item and entity data 130 has control over what the internal service does with such confidential information in the first place.

The entity identifiers 143 comprise, for example, unique identifiers assigned to each entity by the computing environment 103. As non-limiting examples, the entity identifiers 143 may comprise account numbers, user-selected login names, email addresses and/or other identifiers for users. In some embodiments, the computing environment 103 may be configured to scramble or encrypt the entity identifiers 143 before transferring them to third parties.

An item may refer to a product, good, service, software download, multimedia download, social networking profile or any combination, bundle or package thereof, that may be offered for sale, purchase, rental, lease, download and/or other form of consumption and/or acquisition as may be appreciated. The item identifiers 146 comprise, for example, unique identifiers assigned to each item by the entity associated with the computing environment 103. The items may also be thought of as entries in an electronic product catalog of products that are offered by an online merchant via an electronic commerce system. An item identifier 146 can comprise a product style identifier that identifies the product within a product catalog as well as a style of the product (e.g., color), a product name, serial number or any other data that uniquely identifies a product in a product catalog.

An entity identifier 143 may be associated with a portion of unique entity information 140. The activity data facets 136 may be associated with an entity identifier 143 and/or an item identifier 146. Each entity identifier 143 may represent a corresponding entity of computing environment 103. Each item identifier 146 may represent a corresponding item associated with computing environment 103. The computing environment 103 may transmit relevant portions of the activity data facets 136 to third parties, such as, service computing devices 106. Some embodiments of this disclosure relate to preventing the association of the activity data facets 136 with the corresponding entity identifiers 143 representing the entities associated with the data. Other embodiments of this disclosure relate to preventing the association of the activity data facets 136 with the corresponding item identifiers 146 representing the items.

The anonymous request data 133 may include information associated with the anonymization of information sent to the service computing devices 106. The anonymous request data 133 may include, for example, service request data 151a . . . 151N. Each instance of service request data 151, for example, is associated with a request from one of the service computing devices 106. In addition, each instance of service request data 151 includes the anonymous entity identifiers 153 and anonymous item identifiers 156 generated for each request for data that a service computing device 106 sends to the computing environment 103. Each instance of service request data 151, for example, is associated with the operation of the various applications and/or functional entities described below.

The plurality of service computing devices 106a . . . 106N is representative of the plurality service computing devices that may be coupled to the network 109. Each of the service computing devices 106 may comprise, for example, a server computer or any other system providing computing capability. In some embodiments, a plurality of service computing devices 106 may be employed that are arranged, for example, in one or more server banks or computer banks or other arrangements. For example, a plurality of service computing devices 106 together may comprise a cloud computing resource, a grid computing resource and/or any other distributed computing arrangement. Such service computing devices 106 may be located in a single installation or may be distributed among many different geographical locations. In other embodiments, a plurality of service computing devices 106 may be employed in the computing environment 103. For purposes of convenience, each service computing device 106 is referred to herein in the singular. Even though each service computing device 106 is referred to in the singular, it is understood that a plurality of service computing devices 106 may be employed in the various arrangements as described above.

As non-limiting examples, the entity associated with the service computing devices 106 may correspond to a content storage system, an advertiser, an online retailer, cable television provider, radio subscription provider, Internet advertising service, Internet content provider, magazine publisher, newspaper publisher, and/or other content providers, or any other system in which information pertaining to entities and items can be processed and transmitted to other such systems. Significantly, a service computing device 106 may be an internal service that is controlled by the entity restricting access to data or an external service that is not controlled by the entity restricting access to data.

Various applications and/or other functionality may be executed in each service computing device 106 according to various embodiments. Also, various data is stored in the service computing device 106 that is accessible to the computing environment 103. The request policy data 160 may be representative of the details of a plurality of requests for data that the service computing device 106 has sent to the computing environment 103. The request policy data 160, for example, is associated with the operation of the various applications and/or functional entities described below.

The components executed on the service computing device 106, for example, include a requesting service 163 and other applications, services, processes, systems, engines or functionality not discussed in detail herein. The requesting service 163 is executed to send requests for data and obtain responses to those requests to the computing environment 103 over the network 109. To this end, the requesting service 163 may employ simple object access protocol (SOAP), HTTP, extensible markup language (XML) and/or other technologies to facilitate communication and data exchange with services such as service computing device 106.

Next, a general description of the operation of the components of the networked environment 100 is provided, according to various embodiments of the present disclosure. In various embodiments, the requesting service 163 in a service computing device 106 sends a request for data to the computing environment 103, wherein the service computing device 106 does not request anonymized data. The authorization service 121 then determines if the requesting service computing device 106 is authorized to receive the corresponding unique entity information 140 associated with the requested data. If the requesting service computing device 106 is authorized to access the associated unique entity information 140 and has not requested anonymized data, the authorization service 121 will associate the data requested with the unique entity information 140 and transmit the data to the requesting service computing device 106. In such an embodiment, the service computing device 106 receiving the data may have authorized access to the unique entity information 140.

For example, if the entity associated with the computing environment 103 is an online retailer, the online retailer will store private customer information, such as the customer name and address, in unique entity information 140. Further, suppose the entity associated with the service computing device 106 is a billing service within the online retailer. The billing service may send the online retailer a request for the customer name and address associated with the product a customer bought. In such a case, the billing service will have authorized access to such unique entity information 140 because the billing service needs the customer name and address to properly bill the purchased product to the customer.

In other embodiments, the requesting service 163 in the first service computing device 106 sends a request for data to the computing environment 103, wherein the requesting service 163 requests anonymized access to the data or the first service computing device 106 does not have access to the unique entity information 140. The computing environment 103 creates a list of the data requested from the activity data facets 136. The anonymous identifier processor 115 determines which entity identifiers 143 are associated with the requested data. The anonymous identifier processor 115 may then generate a new set of anonymous entity identifiers 153 representing each entity identifier 143 associated with the data requested, each anonymous entity identifier 153 uniquely representing an entity identifier 143. Each newly generated anonymous entity identifier 153 may be unique with respect to each other. The computing environment 103 may store, in anonymous request data 133, the anonymous entity identifiers 153, the details of the first service computing device 106 and the details of the request. It is noted that in this embodiment, the service computing device 106 does not have access to the entity identifiers 143 associated with the data requested. More specifically, the requesting service 163 in the first service computing device 106 may not have access the unique entity information 140, which is associated with the data requested.

In such an embodiment, the requesting service 163 in the first service computing device 106 may make a second request for the same data. In this case, the anonymous identifier processor 115 may transmit the data in association with a previously generated set of anonymous entity identifiers 153 stored in anonymous request data 133. The previously generated set of anonymous entity identifiers 153 may correspond to the anonymous entity identifiers 153 that were generated in response to the previous request for the same data from the first service computing device 106. The computing environment 103 may store, in anonymous request data 133, the details of the second request for data from the first service computing device 106 in association with the previously generated set of anonymous entity identifiers 153. In such an embodiment, only the first service computing device 106 may recognize that the data received from the response to the second request corresponds to the same entities as the data previously received.

For example, if the entity associated with the computing environment 103 is an online retailer, the online retailer will store private customer information, such as the customer identifiers and customer age, in unique entity information 140. Additionally, the activity data facets 136 will store customer activity information, such as a customer purchase history. Further, suppose the entity associated with the service computing device 106 is a recommendation engine within the online retailer. The recommendation engine may generate a list of recommended products which a customer may be additionally interested in purchasing. The recommendation engine generates the list of recommended products based on the past purchase history of other customers who purchased the product in which the customer indicated interest.

The requesting service 163 of the recommendation engine may send the online retailer a request for the past purchase history of the customers who purchased a certain book. The online retailer may create a list of the customer identifiers representing the customers who bought the book and each of their respective ages. The online retailer may then generate a unique anonymous entity identifier 153 to represent each customer who purchased the book. The anonymous entity identifiers 153 will be stored in anonymous request data 133, in association with the requesting recommendation engine and the request. Finally, the online retailer will send the requested customer purchase history in association with the anonymous entity identifiers 153 instead of the customer identifiers. Note that the online retailer may not have access to the entity identifiers 143 after receiving the data in association with the anonymous entity identifiers 153.

As in one embodiment described above, if the recommendation engine requests the customer purchase history related to the book again at a later time, the online retailer may not need to generate a new set of anonymous entity identifiers 153. The online retailer may simply retrieve the stored set of previously generated anonymous entity identifiers 153 from anonymous request data 133 and transmit the requested data with such anonymous entity identifiers 153 to the recommendation engine.

However, suppose the requesting service 163 in the first service computing device 106 requests the same data again, but this time the request policy indicates that the data is going to be used for a different purpose, such as passing the information on to a third party. In such a case, the anonymous identifier processor 115 may generate a new set of anonymous entity identifiers 153 for the first service computing device 106 to represent the same entity identifiers 143 for the first service computing device 106. Each of the new anonymous entity identifiers 153 may be unique with respect to each other. Each of the new anonymous entity identifiers 153 may also be unique with respect to each of the sets of previously generated anonymous entity identifiers 153 stored in anonymous request data 133, which correspond to a request for the same data from the first service computing device 106. More specifically, each newly generated anonymous entity identifier 153 representing a corresponding entity identifier 143 may be different from the previously generated anonymous entity identifiers 153 representing the corresponding entity identifier 143 for the respective service computing device 106.

The anonymous identifier processor 115 may then associate the data requested with the newly generated anonymous entity identifiers 153. The computing environment 103 may store, in anonymous request data 133, the newly generated anonymous entity identifiers 153 and the details of the request in association with the requesting first service computing device 106. The anonymous identifier processor 115 may transmit the data in association with the new set of anonymous entity identifiers 153 to the first service computing device 106.

It is noted that in such a case, the first service computing device 106 does not have access to the entity identifiers 143 associated with the data requested. Thus, the first service computing device 106 may not be able to recognize that the data received is associated with the same entities as the data previously received. For example, since the data previously received from the first request is associated with different anonymous entity identifiers 153 than the data received from the second request, the first service computing device 106 may not correlate the anonymous entity identifiers 153 to determine that multiple sets of data are associated with a specific entity.

Furthermore, the first service computing device 106 may transmit the data to a third party service, which may have also received anonymized data from the computing environment 103. Even if the third party service has data associated with the same entities as the data that service computing device 106 has transmitted to the third party service, the third party service may not recognize that the data corresponds to the same entities. The data stored in the third party service and the data transmitted to the third party service from service computing device 106 will have different anonymous entity identifiers 153 representing one entity identifier 143. Therefore, third party services may not aggregate entity data by correlating unique entity attributes.

For example, suppose the requesting service 163 of the recommendation engine from the previous example sent a second request for the customer purchase history related to the book at a later time, but this time for the purpose of passing the information on to third party services. In such a case, the online retailer may generate a new set of anonymous entity identifiers 153 to represent the users who previously purchased the book. Each newly generated anonymous entity identifier 153 representing a user may be different from any of the previously generated anonymous entity identifiers 153 which represent the user.

As a non-limiting example of such an anonymous entity identifier 153 generation, suppose user John Doe is represented by the user identifier "10001." Further, suppose that the anonymous identifier processor 115 generated "52L9A" as an anonymous entity identifier 153 to represent John Doe in the first request for customer purchase history related to the book. The anonymous identifier processor 115 may generate a new anonymous entity identifier 153 to represent John Doe for each of the subsequent requests from the data collection service for data concerning John Doe. The new anonymous entity identifier 153 may be different from "10001" and "52L9A."

In such an embodiment, if a second service computing device 106 requests data from the computing environment 103, the computing environment 103 may create a list of the data requested from the activity data facets 136. The anonymous identifier processor 115 then determines which identifiers 143 are associated with the requested data. The anonymous identifier processor 115 may generate a new set of anonymous entity identifiers 153 for the second service computing device 106, each anonymous entity identifier 153 uniquely representing each entity identifier 143. Each newly generated anonymous entity identifier 153 may be unique with respect to each other. The computing environment 103 may store, in anonymous request data 133, the newly generated set of anonymous entity identifiers 153, the details of the second service computing device 106 and the details of the request. Note that the anonymous entity identifier 153 representing an entity may not be the same for the first service computing device 106 and the second service computing device 106. Therefore, the second service computing device 106 may not be able to collaborate with the first service computing device 106 to determine if the data that they each respectively store may correlate to the same entity.

For example, suppose again that first service computing device 106 received data associated with John Doe, where John Doe is represented by the anonymous entity identifier "52L9A." The second service computing device 106 may receive data in association with John Doe, where John Doe may be represented by a different anonymous entity identifier 153. Suppose that the second service computing device 106 receives data in association with John Doe, where John Doe is represented by the anonymous entity identifier "786*H." Thereafter, the first service computing device 106 and the second service computing device 106 may not collaborate to determine that they each received data in association with the same user. A respective service computing device 106 may not correlate data based on unique entity information 140 because of the constantly changing anonymous references created to represent entities and items in various embodiments of this disclosure.

In yet another embodiment, the requesting service 163 in a service computing device 106 sends a request for data to the computing environment 103, where the first service computing device 106 requests anonymized data or where the first service computing device 106 does not have access to the item identifiers 146. The computing environment 103 may create a list of the data requested from the activity data facets 136. The anonymous identifier processor 115 may determine which item identifiers 146 are associated with the requested data. The anonymous identifier processor 115 may then generate a new set of anonymous item identifiers 156 representing each item identifier 146 associated with the data, each anonymous entity identifier 153 uniquely representing an entity identifier 143. Each newly generated anonymous item identifier 156 may be unique with respect to each other. The computing environment 103 may store, in anonymous request data 133, the anonymous item identifiers 156, the details of the service computing device 106 and the details of the request. It is noted that in this embodiment, the service computing device 106 does not have access to the item identifiers 146 associated with the data requested.

Furthermore, first service computing device 106 may transmit the data to a third party service which may have also received anonymized data from the computing environment 103. Even if the third party service has data associated with the same items as the data that service computing device 106 has transmitted to the third party service, the third party service may not recognize that the data corresponds to the same items. The data stored in the third party service and the data transmitted to the third party service from service computing device 106 may have different anonymous item identifiers 156 representing a respective item identifier 146. Therefore, third party services may not aggregate item data by correlating item identifiers 146.

Figure 2:
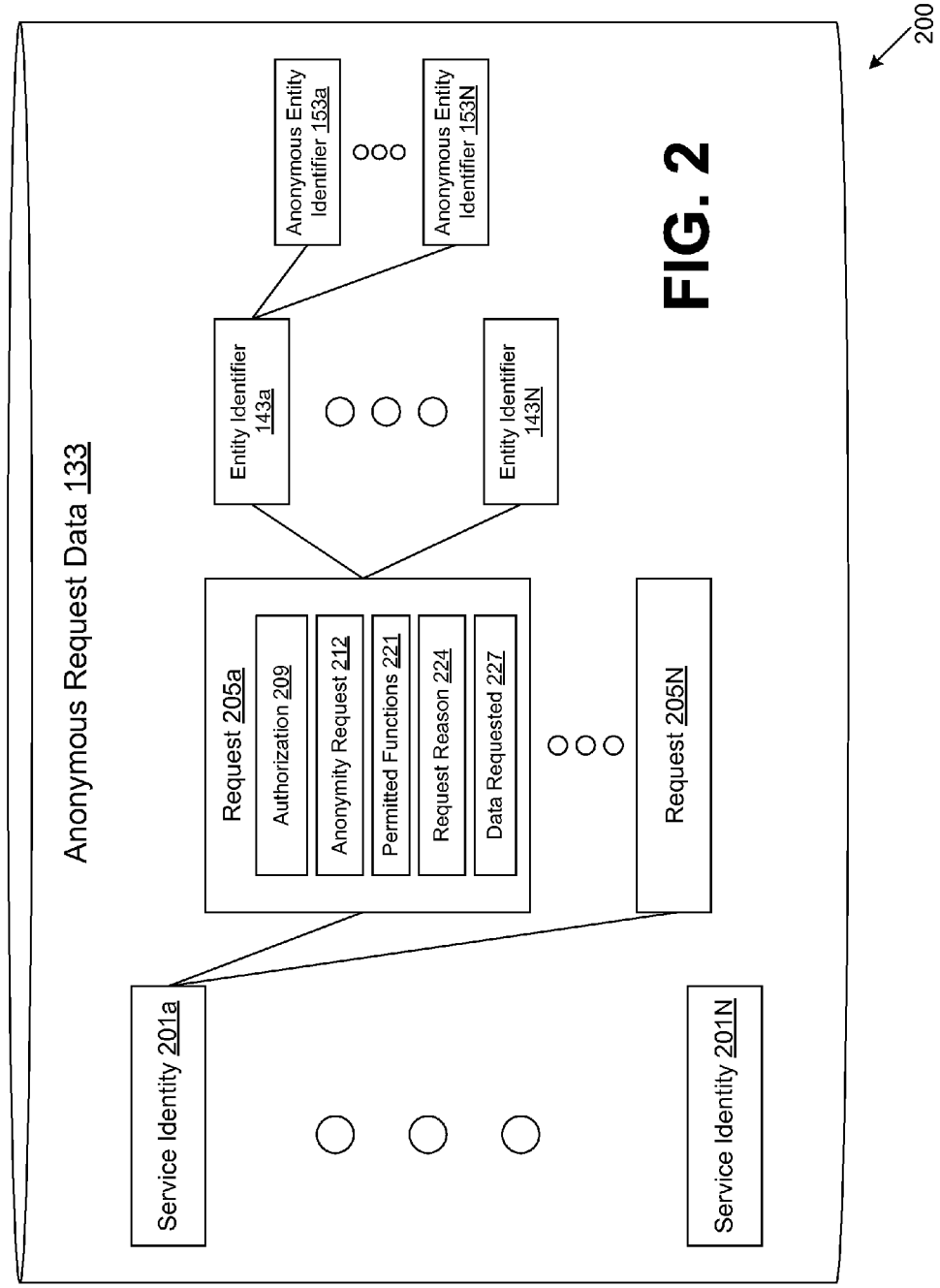
FIG. 2 is a drawing of an example of a data model employed by an anonymization application executed in a computing environment in the networked environment of FIG. 1 according to various embodiments of the present disclosure.

Moving on to FIG. 2, shown is an example of data model 200 that may be employed by the anonymous identifier processor 115 (FIG. 1) and the anonymous identifier translator 118 (FIG. 1) executed in the data store 111 (FIG. 1) in the computing environment 103 (FIG. 1) in the networked environment 100 (FIG. 1). In FIG. 2, the organization of the anonymous request data 133 is illustrated. The anonymous request data 133 may include a plurality of service identities 201a . . . 201N, where each service identity 201 comprises, for example, one of the service computing devices 106 (FIG. 1).

Associated with each of the service identities 201 is a respective plurality of requests 205a . . . 205N. Each request 205a . . . 205N comprises, for example, a request sent by the corresponding service identity 201. As a non-limiting example, where a request 205 comprises a request policy associated with details concerning the request 205, the request 205 may include an authorization 209, an anonymity request 212, permitted functions 221, request reason 224, data requested 227 and other data facets.

The authorization 209 value may be set if the corresponding service identity 201 is authorized to access the unique entity information 140 (FIG. 1) or the item identifiers 146

(FIG. 1). The anonymity request 212 may be set if the corresponding service identity 201 requested anonymized access to the data, wherein the service may not access the unique entity information 140 or the item identifiers 146 associated with the data requested. The permitted functions 221 may represent the functions that the corresponding service identity 201 may perform on the activity data facets 136 (FIG. 1), such as reading or writing the data. The request reason 224 may indicate the purpose for which the corresponding service identity 201 is requesting the data. For example, if the requesting service identity 201 is requesting data that the service identity 201 may intend to pass to other services, the request reason 224 may indicate such intent. Similarly, the request reason 224 may indicate that the requesting service identity 201 is requesting data that it has previously requested for the same purpose as a previous request. For example, if the requesting service identity 201 desires to update the data, the request reason 224 may indicate such a desire. The data requested 227 represents the data from the activity data facets 136 that the corresponding service identity 201 is requesting.

Each instance of request 205 may include a respective plurality of entity identifiers 143a . . . 143N, and each of the entity identifiers 143 may correspond to an entity associated with the data requested 227. Further, each of the entity identifiers 143 may include a respective plurality of anonymous entity identifiers 153a . . . 153N, each of the anonymous entity identifiers 153 comprises, for example, the anonymous entity identifier 153 generated to anonymize the entity identifier 143 associated with the request 205 from the service identity 201.

In some embodiments, the authorization service 121 may determine whether a service computing device 106 is authorized to access the entity identifier 143 by checking if the authorization 209 value is set true. In such an embodiment, the computing environment 103 may allow a service computing device 106 to perform the functions designated in permitted functions 221 on the activity data facet 136. The anonymous identifier processor 115 may send to the corresponding service computing device 106 a previously generated set of anonymous entity identifiers 153 stored in anonymous request data 133 (FIG. 1) if the service computing device 106 has received the data requested 227 previously in anonymized form, so long as the request reason 224 does not indicate that the corresponding service computing device 106 intends to pass the data along to a third party.

Figure 3:
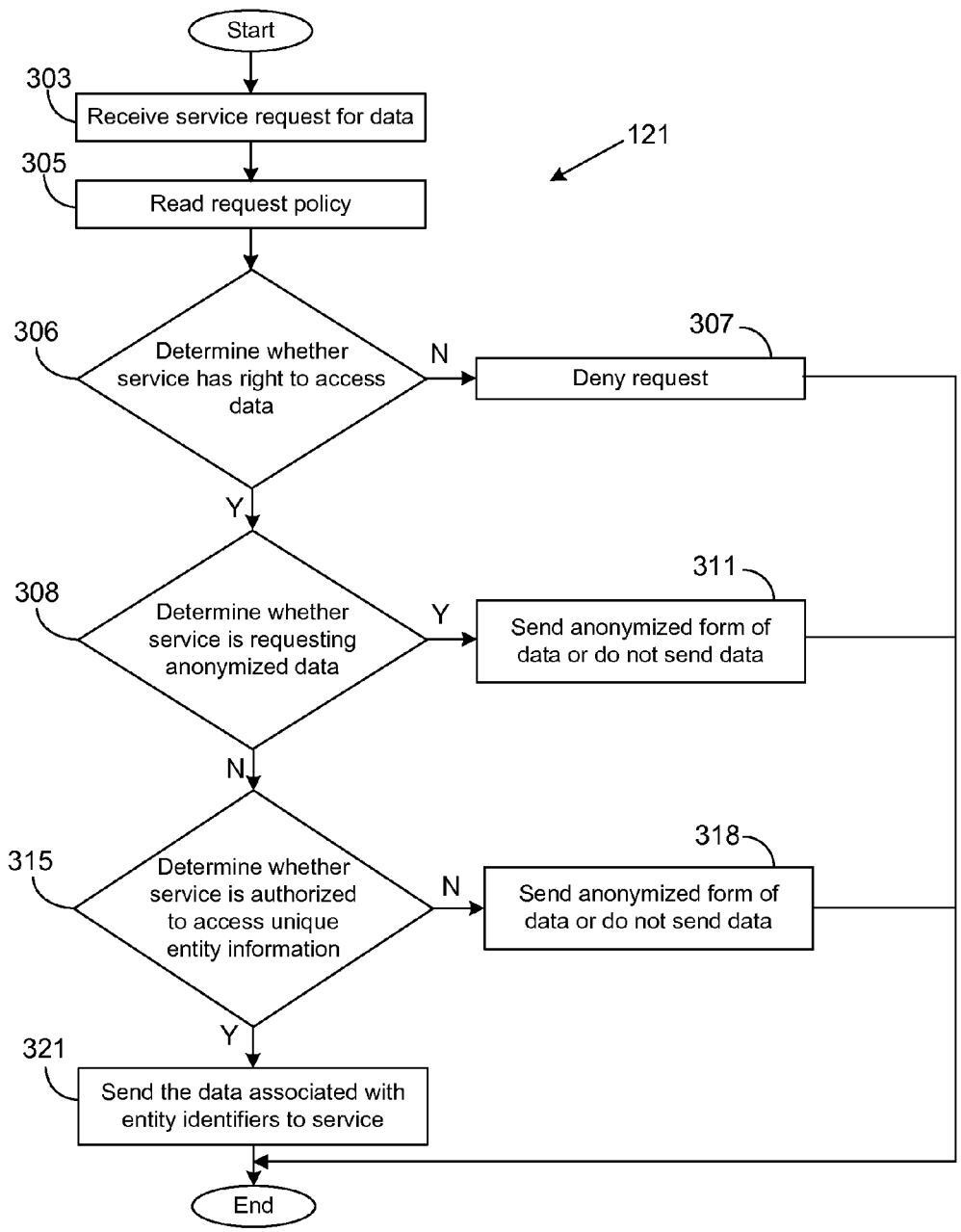
FIG. 3 is a flowchart illustrating an example of a functionality implemented as portions of an authorization service executed in a computing device in the networked environment of FIG. 1 according to various embodiments of the present disclosure.

Turning now to FIG. 3, shown is a flowchart that provides one example of the operation of a portion of the authorization service 121 according to various embodiments. It is understood that the flowchart of FIG. 3 provides merely an example of the many different types of functional arrangements that may be employed to implement the operation of the portion of the authorization service 121 as described herein. As an alternative, the flowchart of FIG. 3 may be viewed as depicting an example of steps of a method implemented in the computing environment 103 (FIG. 1) according to one or more embodiments.

More specifically, FIG. 3 depicts how the authorization service 121 determines whether a requesting service computing device 106 (FIG. 1) is authorized to receive data in association with the unique entity information 140. Beginning with box 303 in FIG. 3, authorization service 121 may receive a request for data from the requesting service 163 in a service computing device 106. In box 305, the authorization service 121 will read the request policy, which may include the data requested 226 (FIG. 2) and an anonymity request 212 (FIG. 2). Such a request may be for at least a portion of the activity data facets 136. The authorization service 121 may generate a listing of the relevant portions of the activity data facets 136 in response to the request.

In box 306, the authorization service 121 determines whether a service computing device 106 has the right to access the data requested. If the service computing device 106 does not have the right to access the data, then the authorization service 121 proceeds to box 307 where the request is denied. Thereafter the portion of authorization service 121 ends as shown. If, in box 306, the service computing device 106 does have the right to access the data requested, then the authorization service 121 determines whether a service computing device 106 is requesting anonymized data in box 308. If the service is requesting anonymized data, then in box 311 the authorization service 121 sends the request policy to the anonymous identifier processor 115 to anonymize the data. Thereafter, the portion of the authorization service 121 ends.

In box 308, if the service computing device 106 is not requesting anonymized data, then in box 315 the authorization service 121 determines whether the requesting service computing device 106 is authorized to access the unique entity information 140. If the service computing device 106 is not authorized to access the unique entity information 140, then in box 318 the authorization service 121 will send the request policy to the anonymous identifier processor 115 to anonymize the data. Thereafter the portion of the authorization service 121 ends.

However, if the service computing device 106 is authorized to access the unique entity information 140, then in box 321 the authorization service 121 transmits the data requested in association with the unique entity information 140. Thereafter, the portion of the authorization service 121 ends.

Figure 4:
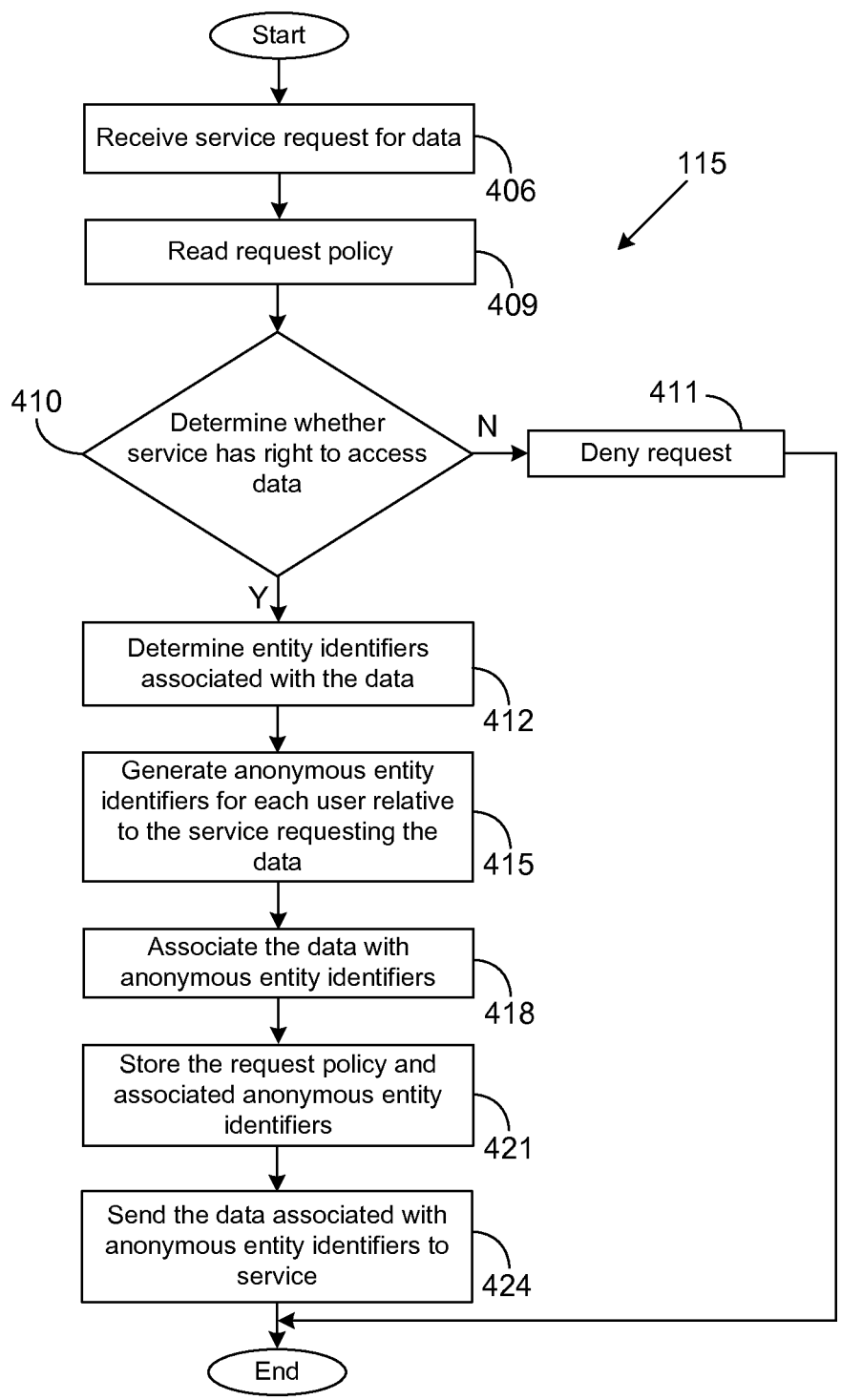
FIG. 4 is a flowchart illustrating an example of a functionality implemented as portions of an anonymous identifier processor executed in a computing device in the networked environment of FIG. 1 according to various embodiments of the present disclosure.

Moving on to FIG. 4, shown is a flowchart that provides one example of the operation of a portion of the anonymous identifier processor 115, according to various embodiments. It is understood that the flowchart of FIG. 4 provides merely an example of the many different types of functional arrangements that may be employed to implement the operation of the portion of the anonymous identifier processor 115 as described herein. As an alternative, the flowchart of FIG. 4 may be viewed as depicting an example of steps of a method implemented in the computing environment 103 (FIG. 1) according to one or more embodiments.

More specifically, FIG. 4 depicts how the anonymous identifier processor 115 sends anonymized data to a service computing device 106 (FIG. 1). Beginning with box 406 in FIG. 4, the anonymous identifier processor 115 may receive a request for data from the requesting service 163 (FIG. 1) in a service computing device 106. In box 409, the anonymous identifier processor 115 reads the request policy, which may include the data requested 226 (FIG. 2). Such a request may be for at least a portion of the activity data facets 136 (FIG. 1). The authorization service 121 (FIG. 1) may generate a listing of the relevant portions of the activity data facets 136 in response to the request.

In box 410, anonymous identifier processor 115 determines whether a service computing device 106 has the right to access the data requested. If the service computing device 106 does not have the right to access the data, then, in box 411, the anonymous identifier processor 115 will deny the request. Thereafter the portion of the anonymous identifier processor 115 ends. If, in box 410, the service computing device does have the right to access the data requested, then in box 412, the anonymous identifier processor 115 determines which entity identifiers 143 (FIG. 1) are associated with the requested data. In box 415, the anonymous identifier processor 115 generates anonymous entity identifiers 153 (FIG. 1)

for each of the entity identifiers 143 determined in box 412. Each of the new anonymous entity identifiers 153 may be unique with respect to each other. Each of the new anonymous entity identifiers 153 may also be unique with respect to each of the sets of previously generated anonymous entity identifiers 153 stored in anonymous request data 133 (FIG. 1) which comprises, for example, a request for the same data from the first service computing device 106. In box 418, the anonymous identifier processor 115 associates the data to be sent with the generated anonymous entity identifiers 153.

In box 421, the anonymous identifier processor 115 then stores the request policy and associated anonymous entity identifiers 153 in anonymous request data 133. In box 424, the anonymous identifier processor 115 sends the data associated with the anonymous entity identifiers 153 to the requesting service computing device 106. Thereafter, the portion of the anonymous identifier processor 115 ends.

Figure 5:
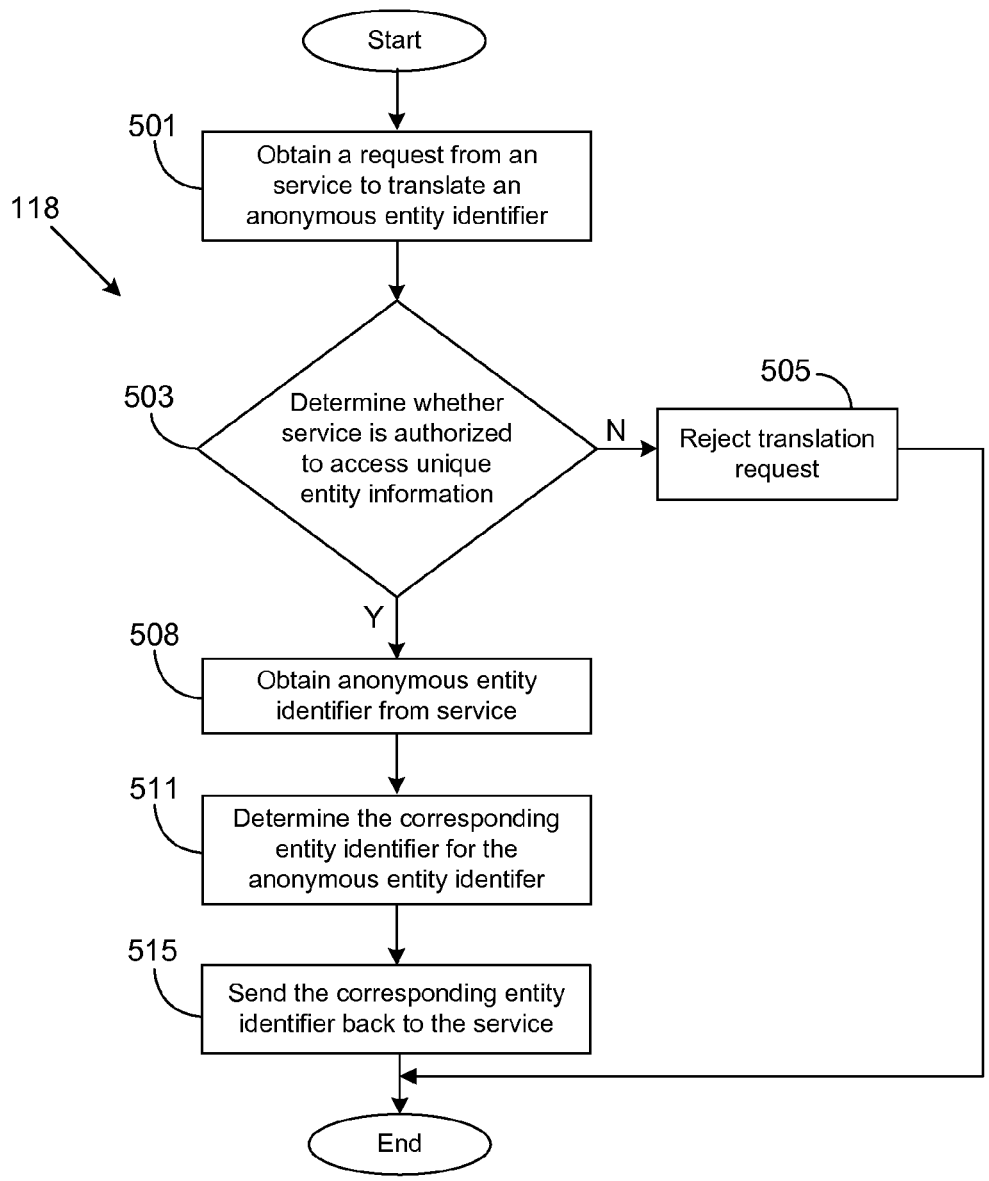
FIG. 5 is a flowchart illustrating an example of a functionality implemented as portions of an anonymous identifier translator executed in a computing device in the networked environment of FIG. 1 according to various embodiments of the present disclosure.

Moving on to FIG. 5, shown is a flowchart that provides one example of the operation of a portion of the anonymous identifier translator 118, according to various embodiments. It is understood that the flowchart of FIG. 5 provides merely an example of the many different types of functional arrangements that may be employed to implement the operation of the portion of the anonymous identifier translator 118 as described herein. As an alternative, the flowchart of FIG. 5 may be viewed as depicting an example of steps of a method implemented in the computing environment 103 (FIG. 1) according to one or more embodiments.

More specifically, FIG. 5 depicts how the anonymous identifier translator 118 translates a given anonymous entity identifier 153 (FIG. 1) into the respective unique entity information 140 (FIG. 1) which the anonymous entity identifier 153 represents. It is understood that the flowchart of FIG. 5 provides an example of the steps executed by the anonymous identifier translator 118 upon receiving a request for translation from an internal service. However, the flowchart of FIG. 5 may be viewed as an example of the steps executed by the anonymous identifier translator 118 upon receiving a request for translation from an external service as well.

Beginning with box 501 in FIG. 5, the anonymous identifier translator 118 obtains a request from a service computing device 106 (FIG. 1) to translate a given anonymous entity identifier 153 into the corresponding entity identifier 143 (FIG. 1). In box 503, the anonymous identifier translator 118 determines whether the requesting service computing device 106 is authorized to access to the corresponding entity identifiers 143. In box 505, if the service computing device 106 is not authorized to access the entity identifiers 143, the anonymous identifier translator 118 rejects the translation request. Thereafter the portion of the anonymous identifier translator 118 ends.

In box 508, if the service computing device 106 is authorized to access the entity identifiers 143, the anonymous identifier translator 118 obtains the anonymous entity identifier 153 which the service computing device 106 has requested to be translated. In box 511, the anonymous identifier translator 118 may determine the corresponding entity identifier 143 from the anonymous request data 133 (FIG. 1). In box 515, the anonymous identifier translator 118 may send the corresponding entity identifier 143 back to the requesting service computing device 106. Alternatively, the anonymous identifier translator 118 may not send the corresponding entity identifier 143 back to the requesting service computing device 106. Thereafter, the portion of the anonymous identifier translator 118 ends.

Figure 6:
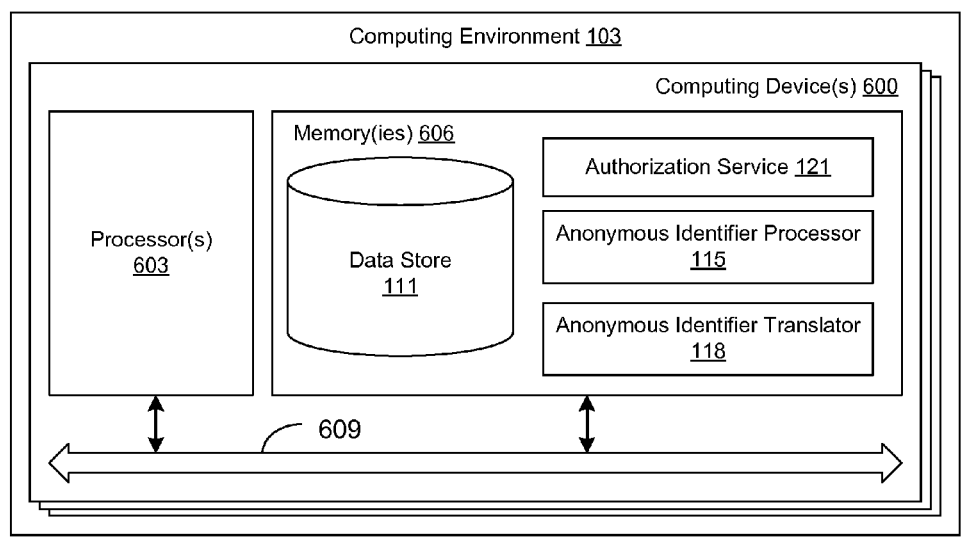
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 600 according to an embodiment of the present disclosure. The computing device 600 includes at least one processor circuit, for example, having a processor 603 and a memory 606, both of which are coupled to a local interface 609. To this end, the computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are anonymous identifier processor 115 (FIG. 1), anonymous identifier translator 118 (FIG. 1), authorization service 121 (FIG. 1), and potentially other applications. Also stored in the memory 606 may be a data store 111 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate networked environment 100 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the anonymous identifier processor 115, the anonymous identifier translator 118, the authorization service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3, 4, and 5 show the functionality and operation of an implementation of portions of the anonymous identifier processor 115, the anonymous identifier translator 118, and the authorization service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. Further, in some embodiments, one or more of the blocks shown in FIGS. 3, 4, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the anonymous identifier processor 115, the anonymous identifier translator 118, and the authorization service 121, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein when executed the program causes the computing device to at least:

transmit to a service a first response to a request for data, wherein the first response comprises the data expressed in association with a plurality of first anonymous entity identifiers, wherein individual ones of the plurality of first anonymous entity identifiers represent a corresponding one of a plurality of entity identifiers, and wherein the individual ones of the plurality of first anonymous entity identifiers are unique with respect to one another; and transmit to the service a second response to the request for the data, wherein the second response comprises the data expressed in association with a plurality of second anonymous entity identifiers, wherein individual ones of the plurality of second anonymous entity identifiers represent the corresponding one of the plurality of entity identifiers, and wherein the individual ones of the plurality of second anonymous entity identifiers are unique with respect to one another.

2. The non-transitory computer-readable medium of claim 1, wherein individual ones of the plurality of entity identifiers represent a corresponding one of a plurality of entities, the individual ones of the plurality of entity identifiers being unique with respect to one another.

3. The non-transitory computer-readable medium of claim 1, wherein when executed the program further causes the computing device to at least, in response to receiving the request for the data from the service, determine whether the service has authorization to access the plurality of entity identifiers.

4. A system, comprising:
   at least one computing device; and
   an anonymization service executable in the at least one computing device, wherein when executed the anonymization service causes the at least one computing device to at least:
      transmit to a service, a first response to a request for data, the first response comprising the data expressed in association with a plurality of first anonymous entity identifiers, individual ones of the plurality of first anonymous entity identifiers representing a corresponding one of a plurality of entity identifiers, the individual ones of the plurality of first anonymous entity identifiers being unique with respect to one another; and
      transmit to the service, a second response to the request for the data, the second response comprising the data expressed in association with a plurality of second anonymous entity identifiers, wherein individual ones of the second anonymous entity identifiers represent a corresponding one of the plurality of entity identifiers, wherein the individual ones of the plurality of second anonymous entity identifiers are unique with respect to one another, and wherein, for the individual ones of the plurality of entity identifiers, the corresponding first and second anonymous entity identifiers are different from each other.

5. The system of claim 4, wherein the request for the data comprises a first request for the data, and when executed the anonymization service further causes the at least one computing device to at least, in response to receiving a second request for the data and determining that the anonymization service has previously transmitted the data expressed in association with the plurality of first anonymous entity identifiers, transmit to the service, a third response comprising the data expressed in association with the plurality of first anonymous entity identifiers.

6. The system of claim 4, wherein the data comprises first data, and the anonymization service when executed further causes the at least one computing device to at least, in response to receiving a request for second data that is different from the first data, transmit to the service a third response comprising the second data expressed in association with a plurality of third anonymous entity identifiers, wherein the individual ones of the plurality of third anonymous entity identifiers represent a corresponding one of the plurality of entity identifiers, wherein the individual ones of the plurality of third anonymous entity identifiers are unique with respect to one another, and wherein, for the individual ones of the plurality of entity identifiers, the corresponding first, second, and third anonymous entity identifiers are different from one another.

7. The system of claim 4, wherein the request for the data comprises a first request for the data, and the anonymization service when executed further causes the at least one computing device to at least, in response to receiving a second request for the data, determining that the service is authorized to access the plurality of entity identifiers, and determining that the service has not requested anonymized access to the data, transmit to the service, a third response comprising the data expressed in association with the plurality of entity identifiers.

8. The system of claim 4, wherein when executed the anonymization service further causes the at least one computing device to at least restrict access to the data expressed in association with a plurality of item identifiers, individual ones of the plurality of item identifiers representing a corresponding one of a plurality of items, the individual ones of the plurality of item identifiers being unique with respect to one another.

9. The system of claim 8, wherein the request for the data comprises a first request for the data, and when executed the anonymization service further causes the at least one computing device to at least, in response to receiving a second request for the data, transmit to the service a third response comprising the data expressed in association with a plurality of anonymous item identifiers, individual ones of the plurality of anonymous item identifiers representing a corresponding one of the plurality of item identifiers, individual ones of the plurality of anonymous item identifiers being unique with respect to one another.

10. A method, comprising:
    transmitting to a first service, via at least one of one or more computing devices, a first response to a request by the first service for data associated with one of a plurality of entities, the first response comprising the data expressed in association with a first anonymous entity identifier uniquely representing, for the first service, the one of the plurality of entities corresponding to one of a plurality of entity identifiers, each of the plurality of entity identifiers being unique with respect to one another; and
    transmitting to a second service, via at least one of the one or more computing devices, a second response to a request by the second service for the data, the second response comprising the data expressed in association with a second anonymous entity identifier uniquely representing, for the second service, the one of the plurality of entities corresponding to the one of the plurality of entity identifiers.

11. The method of claim 10, wherein the request by the first service for the data comprises a first request for the data, the method further comprising:
    in response to receiving from the first service a second request for the data, transmitting to the first service, via at least one of the one or more computing devices, a third response comprising the data expressed in association with the first anonymous entity identifier.

12. The method of claim 10, wherein the request by the first service for the data comprises a first request for the data, the method further comprising:
    in response to receiving from the first service a second request for the data, transmitting to the first service, via at least one of the one or more computing devices, a third response comprising the data expressed in association with a third anonymous entity identifier uniquely representing, for the first service, the one of the entities corresponding to the one of the entity identifiers, the third anonymous entity identifier being unique with respect to the first anonymous entity identifier.

13. The method of claim 10, wherein the data comprises first data, the method further comprising:
    in response to receiving from the first service a request for second data that is unique with respect to the first data, transmitting to the first service, via at least one of the one or more computing devices, a third response comprising the second data expressed in association with a third anonymous entity identifier uniquely representing, for the first service, the one of the entities corresponding to the one of the entity identifiers, the third anonymous entity identifier being unique with respect to the first anonymous entity identifier.

14. The method of claim 10, further comprising:
    in response to receiving a request by a third service for the data and determining that the third service is authorized to access the one of the plurality of entity identifiers, transmitting to the third service, via at least one of the one or more computing devices, a third response comprising the data expressed in association with the one of the plurality of entity identifiers.

15. The method of claim 10, further comprising:

in response to receiving a request by a third service for the data and determining that the third service is authorized to access the one of the plurality of entity identifiers but that the third service is requesting to receive anonymized access to the data, transmitting to the third service, via at least one of the one or more computing devices, a third response comprising the data expressed in association with a third anonymous entity identifier uniquely representing for the third service the one of the plurality of entities corresponding to the one of the plurality of entity identifiers.

16. The method of claim 10, further comprising:

receiving the first anonymous entity identifier from an internal service within at least one of the one or more computing devices.

17. The method of claim 10, further comprising:

translating the first anonymous entity identifier received back from an internal service into the respective one of the plurality of entity identifiers.

18. The method of claim 10, further comprising:

denying access to the respective one of the plurality of entity identifiers to the first service and the second service.

19. The method of claim 10, wherein the first anonymous entity identifier is different from the second anonymous entity identifier.

20. The method of claim 10, wherein the entity comprises a user.

* * * * *